(12) United States Patent
Machida (10) Patent No.: US 7,696,985 B2
(45) Date of Patent: Apr. 13, 2010

(54) PRODUCING DISPLAY CONTROL SIGNALS FOR HANDHELD DEVICE DISPLAY AND REMOTE DISPLAY

(75) Inventor: Akihiro Machida, Sunnyvale, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 973 days.

(21) Appl. No.: 11/290,058

(22) Filed: Nov. 30, 2005

(65) Prior Publication Data

US 2007/0120824 A1    May 31, 2007

(51) Int. Cl.
G09G 5/00 (2006.01)
(52) U.S. Cl. .................. 345/169; 345/168; 345/170; 345/172; 345/171
(58) Field of Classification Search ............ 345/6, 345/167–175, 676, 629, 418, 473, 689, 156, 345/157; 711/155; 434/317; 455/456.3; 701/29; 370/311; 702/150
See application file for complete search history.

(56) References Cited

U.S. PATENT DOCUMENTS

| | | | |
|---|---|---|---|
| 5,682,529 A | 10/1997 | Hendry et al. | |
| 5,926,166 A | 7/1999 | Khederzadeh et al. | |
| 5,935,226 A | 8/1999 | Klein | |
| 5,943,625 A | 8/1999 | Yeom et al. | |
| 5,991,883 A | 11/1999 | Atkinson | |
| 6,038,670 A | 3/2000 | Oh | |
| 6,057,540 A | 5/2000 | Gordon et al. | |
| 6,145,029 A | 11/2000 | Deschepper et al. | |
| 6,285,354 B1 | 9/2001 | Revis | |
| 6,304,244 B1 | 10/2001 | Hawkins et al. | |
| 6,438,622 B1 | 8/2002 | Haghighi et al. | |
| 6,462,763 B1 * | 10/2002 | Mostyn | 715/856 |
| 6,654,826 B1 | 11/2003 | Cho et al. | |
| 6,665,173 B2 * | 12/2003 | Brandenberg et al. | 361/680 |
| 6,864,891 B2 | 3/2005 | Myers | |
| 6,909,906 B1 | 6/2005 | Miyashita | |
| 7,102,626 B2 * | 9/2006 | Denny, III | 345/179 |
| 7,209,813 B2 * | 4/2007 | Namaky | 701/29 |
| 7,248,231 B2 * | 7/2007 | Hurley et al. | 345/2.1 |
| 7,249,257 B2 * | 7/2007 | Brundage et al. | 713/176 |
| 7,450,110 B2 * | 11/2008 | Shahoian et al. | 345/173 |
| 7,508,418 B2 * | 3/2009 | Renkis | 348/211.2 |
| 7,576,730 B2 * | 8/2009 | Anwar | 345/173 |
| 2002/0011990 A1 * | 1/2002 | Anwar | 345/173 |
| 2002/0030668 A1 * | 3/2002 | Hoshino et al. | 345/175 |
| 2002/0073247 A1 | 6/2002 | Baweja et al. | |
| 2002/0147910 A1 * | 10/2002 | Brundage et al. | 713/176 |
| 2003/0014212 A1 * | 1/2003 | Ralston et al. | 702/150 |
| 2003/0034959 A1 | 2/2003 | Davis et al. | |
| 2003/0067470 A1 | 4/2003 | Main et al. | |
| 2003/0137469 A1 | 7/2003 | Hansen et al. | |
| 2003/0206394 A1 * | 11/2003 | Ossia | 361/680 |
| 2004/0069117 A1 * | 4/2004 | Akins | 84/486 |

(Continued)

FOREIGN PATENT DOCUMENTS

WO    WO 97/37293    10/1997

*Primary Examiner*—Prabodh M Dharia (57) ABSTRACT

Systems and methods of producing display control signals for a handheld device display and a remote displace are described. In one aspect, display control signals are produced in response to user input. In a handheld device mode of operation, the display control signals are selectively communicated to a display subsystem of a handheld device. In an input device mode of operation, the display control signals are selectively communicated to a peripheral device communication channel.

14 Claims, 8 Drawing Sheets

U.S. PATENT DOCUMENTS

| | | | |
|---|---|---|---|
| 2004/0090424 A1* | 5/2004 | Hurley et al. | 345/169 |
| 2004/0135741 A1* | 7/2004 | Tomisawa et al. | 345/6 |
| 2004/0189609 A1* | 9/2004 | Estes et al. | 345/169 |
| 2004/0263472 A1* | 12/2004 | Tachikawa | 345/156 |
| 2005/0117130 A1* | 6/2005 | Bohn et al. | 353/119 |
| 2005/0275633 A1* | 12/2005 | Varanda | 345/173 |
| 2006/0063539 A1* | 3/2006 | Beyer | 455/456.3 |
| 2006/0075934 A1* | 4/2006 | Ram | 108/44 |
| 2006/0092866 A1* | 5/2006 | Kim et al. | 370/310 |
| 2006/0152489 A1* | 7/2006 | Sweetser et al. | 345/158 |
| 2006/0244733 A1* | 11/2006 | Geaghan | 345/173 |
| 2006/0250377 A1* | 11/2006 | Zadesky et al. | 345/173 |
| 2007/0026371 A1* | 2/2007 | Wood | 434/317 |
| 2007/0135057 A1* | 6/2007 | Nallapureddy et al. | 455/67.13 |
| 2007/0146347 A1* | 6/2007 | Rosenberg | 345/173 |
| 2007/0162858 A1* | 7/2007 | Hurley et al. | 715/732 |
| 2008/0291855 A1* | 11/2008 | Bata et al. | 370/311 |
| 2009/0266892 A1* | 10/2009 | Windauer et al. | 235/404 |

* cited by examiner

PRODUCING DISPLAY CONTROL SIGNALS FOR HANDHELD DEVICE DISPLAY AND REMOTE DISPLAY

BACKGROUND

Recent publications have proposed combining the functionality of computer mice into cordless and wired telephone handsets in an effort to reduce workplace clutter. In these proposals, the combined computer mouse and telephone handset communicates with a computer that is connected by a fixed wire line connection to a public switched telephone network (PSTN). In a first mode of operation, the combined computer mouse and telephone handset operates as a standard wired or cordless telephone. In a second mode of operation, the combined computer mouse and telephone handset operates as a standard computer mouse capable of entering commands into the computer.

Many different data input schemes have been developed for handheld devices. For example, some mobile telephone apparatus, such as a combined mobile telephone and personal digital assistant, include a keypad that contains a minimal number of keys and a touch screen display that displays an output and receive a touch input. Software may be used to display icons on the touch screen that represent buttons or keys. A user may activate a desired function by touching the touch screen display region displaying the button corresponding to the desired function. The limited number of keys on the keypad and the small size of the touch screen make the entry of data and commands into such mobile telephones difficult. In an effort to overcome this difficulty, a mobile telephone that includes a detachable input apparatus has been proposed. The detachable input apparatus includes a coordinate information generator (i.e., a trackball) that generates coordinate information based on movement of the input apparatus on a flat surface. The coordinate information is used to control the position of a cursor on a screen of the mobile telephone.

What is needed are systems and methods of producing display control signals for a handheld device display and a remote display.

SUMMARY

In one aspect, the invention features a handheld device that includes a display subsystem and a pointing device subsystem. The pointing device subsystem produces display control signals in response to user input. The pointing device subsystem has a handheld device mode of operation in which the pointing device subsystem selectively communicates the display control signals to the display subsystem. The pointing device subsystem also has an input device mode of operation in which the pointing device subsystem selectively communicates the display control signals to a peripheral device communication channel.

In another aspect, the invention features a method of producing display control signals in accordance with which display control signals are produced in response to user input. In a handheld device mode of operation, the display control signals are selectively communicated to a display subsystem of a handheld device. In an input device mode of operation, the display control signals are selectively communicated to a peripheral device communication channel.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such elements.

The embodiments that are described in detail below provide systems and methods of producing display control signals for a handheld device display and a remote display.

Figure 1:
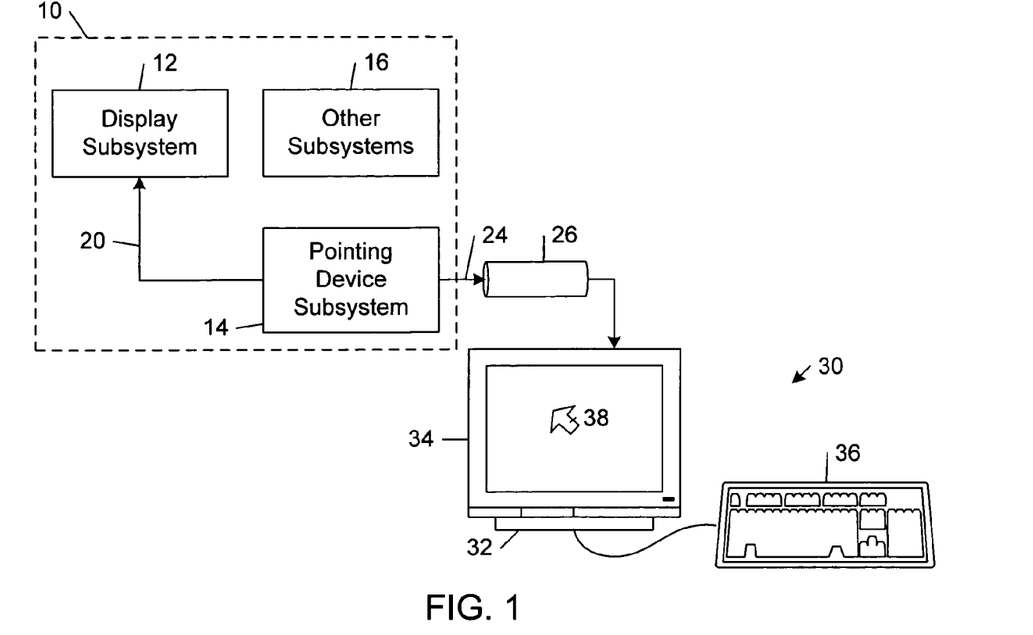
FIG. 1 is a diagrammatic view of an embodiment of a handheld device that includes a display subsystem and a pointing device subsystem, which is coupled to the display subsystem and a remote computer system.

FIG. 1 shows an embodiment of a handheld device 10 that includes a display subsystem 12, a pointing device subsystem 14, and other subsystems 16. The display subsystem 12 includes a display screen (referred to herein as the "local display screen") and may include a display adapter that is configured to transmit image data signals to the display screen. The other subsystems 16 include any other subsystems that implement the functionality of the handheld device 10. The subsystems 12, 14, 16 may have separate components or they may share one or more components (e.g., memory and processing resources). In general, the handheld device 10 may be any type of handheld electronic device that includes a display screen and receives input data from a user, including a cellular telephone, a cordless telephone, a pager, a personal digital assistant (PDA), a digital audio player, a digital camera, and a digital video game console.

Figure 2:
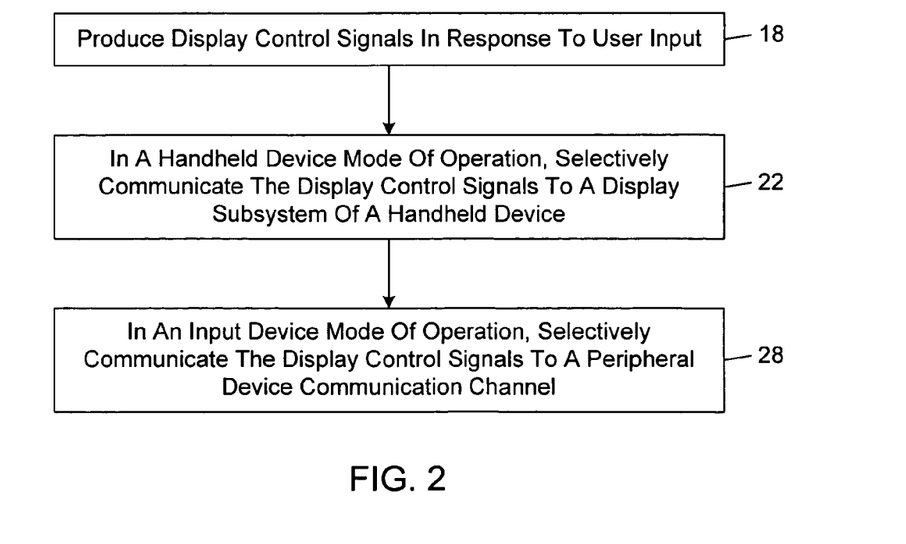
FIG. 2 is a flow diagram of an embodiment of a method of producing display control signals for a handheld device display and a remote display.

FIG. 2 shows an embodiment of a method that is implemented by the pointing device subsystem 14.

The pointing device subsystem 14 produces display control signals in response to user input (FIG. 2, block 18). Examples of the types of display control signals that may be produced by the pointing device subsystem 14 include cursor position and movement data and scrolling position and distance data. In general, the pointing device subsystem 14 may produce the display control signals in response to various types of user input, including manipulation of a movable member (e.g., a rotatable wheel, a slidable slider, a rotatable ball, a movable stylus, a movable stick, or a user's finger relative to the handheld device 10) and manipulation of the entire handheld device 10 (e.g., manipulation of the entire handheld device 10 across a surface).

The pointing device subsystem 14 has a handheld device mode operation in which it operates as a handheld device (e.g., a cellular telephone, a cordless telephone, a pager, a personal digital assistant (PDA), a digital audio player, a digital camera, and a digital video game console), and a pointing device mode of operation in which it operates as a pointing device for a remote system. In general, the mode of operation of the pointing device subsystem 14 may be set manually by a user (e.g., by setting a mode control switch) or it may be set automatically by the pointing device subsystem 14 (e.g., by detecting a condition or state of the handheld device 10).

In the handheld device mode of operation, the pointing device subsystem 14 selectively communicates the display control signals 20 to the display subsystem 12 (FIG. 2, block 22). In some embodiments, the display control signals 20 directly control the display and movement of a pointer on the local display screen of the display subsystem 12. In other embodiments, a display adapter processes the display control signals 20 to control the display and movement of a pointer on the local display screen.

In the input device mode of operation, the pointing device subsystem 14 selectively communicates the display control signals 24 to a peripheral device communication channel 26 (FIG. 2, block 28). In general, the peripheral device communication channel 26 may be any type of wired or wireless communication channel. In some embodiments, the peripheral device communication channel 26 is a wired serial communication channel, such as an RS-232 serial link, a universal serial bus link, a PS/2 port link. In other embodiments, the peripheral device communication channel 26 is a wireless communication channel, such as an infrared (IR) wireless link or a radio frequency (RF) wireless link. In these embodiments, the pointing device subsystem 14 communicates over the wireless communication channel in accordance with a particular communication protocol (or interface). The RF communication channels typically may lie within the 46-49 MHz frequency band, the 902-928 MHz frequency band, or the 2.4-2.48 GHz frequency band. The RF communication protocol may be any of the short-range radio communication protocols that have been proposed, including the Bluetooth communication protocol and the IEEE 802.11 (radio-LAN) communication protocol.

The display control signals 24 are transmitted over the peripheral device communication channel 26 to a remote display-based system 30. In general, the remote system 30 may be any type of display-based appliance that receives user input, including a general-purpose computer system, a special-purpose computer system, and a video game system. In the embodiment shown in FIG. 2, the remote system 30 is a computer system that includes a processing system 32, a display screen 34, and a keyboard 36. In general, the processing system 32 may include one or more processors, each of which may be in the form of any one of various commercially available processors. Generally, each processor receives instructions and data from a read-only memory and/or a random access memory. The system memory typically includes a read only memory (ROM) that stores a basic input/output system (BIOS) that contains start-up routines for the computer, and a random access memory (RAM). The computer also may include a hard drive, a floppy drive, and CD ROM drive that contain respective computer-readable media disks that provide non-volatile or persistent storage for data, data structures and computer-executable instructions. In operation, the processing system 32 executes a driver in an operating system or an application program that processes the display control signals 24 to control the display and movement of a pointer 38 on the display screen 34.

Figure 3:
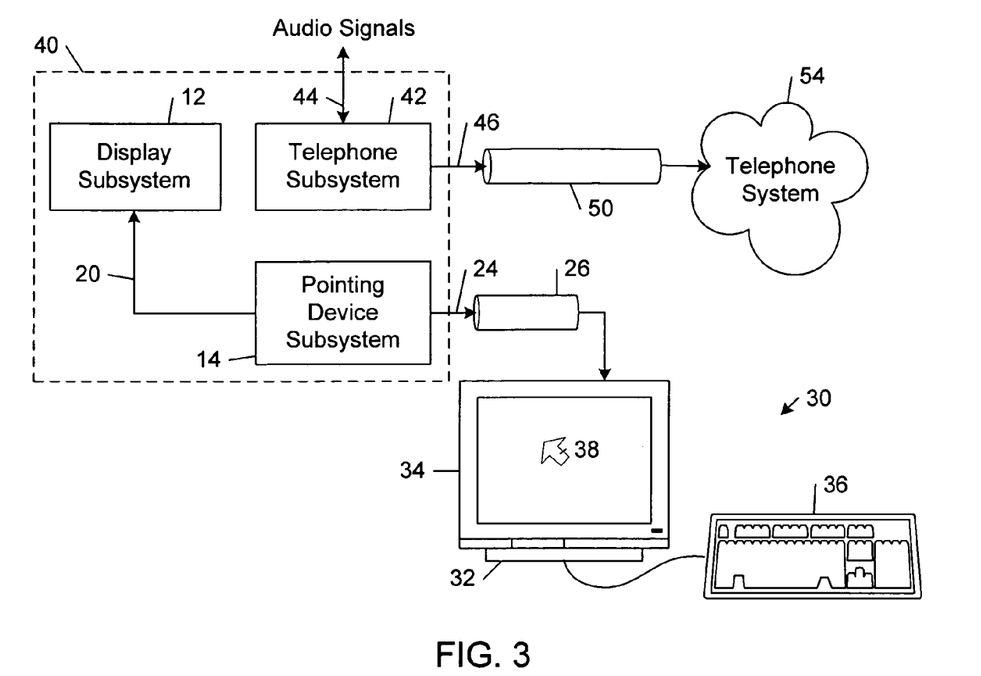
FIG. 3 is a diagrammatic view of an embodiment of the handheld device shown in FIG. 1 that includes a telephone subsystem.

FIG. 3 shows an embodiment of the handheld device 10 in which the other subsystems 16 are implemented by a telephone subsystem 42. In general, the telephone subsystem 42 converts sounds into electrical signals and vice versa. The telephone subsystem 42 may correspond to any of a variety of different types of telephones, including a wired telephone and a wireless telephone (e.g., a cellular telephone and a cordless telephone).

Figure 4:
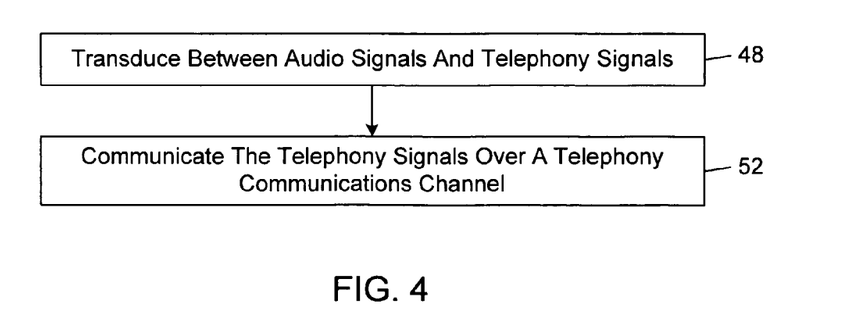
FIG. 4 is a flow diagram of an embodiment of a method that is implemented by the telephone subsystem of the handheld device shown in FIG. 3.

FIG. 4 shows an embodiment of a method that is implemented by the telephone subsystem 42. The telephone subsystem 42 transduces between audio signals 44 and telephony signals 46 (FIG. 4, block 48). In this regard, the telephone subsystem typically includes a microphone for converting received audio signals into electrical signals and a speaker for converting received electrical signals into audio signals.

The telephone subsystem 42 communicates the telephony signals 46 over a telephony communications channel 50 (FIG. 4, block 52). The telephony signals 46 may formatted in accordance with any of a variety of different telephone protocols, including public switched telephone network protocols (e.g., Signaling System 7 and Intelligent Network), analog cellular telephone protocols (e.g., Advanced Mobile Phone Service), digital cellular telephone protocols (e.g., TDMA, CDMA, GSM, and WAP), and cordless telephone protocols (e.g., Digital Enhanced Cordless Telecommunications). The telephony communications channel 50 couples the handheld device 40 to a telephone system 54, which may include one or more of a wireless telephone network, a wired telephone network (e.g., a PSTN), and a cordless telephone base station.

Figure 5:
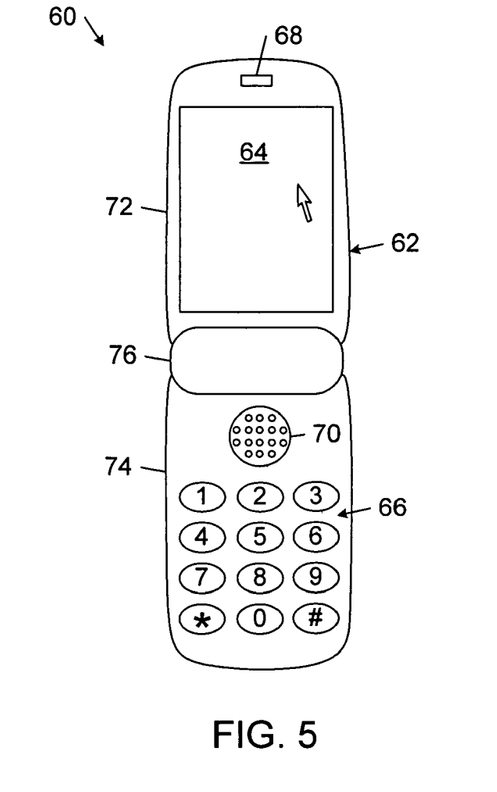
FIG. 5 is a diagrammatic top view of an embodiment of the handheld device shown in FIG. 3 in an open state.

FIG. 5 shows an embodiment 60 of the handheld device 40 that includes a housing 62, a display screen 64, a keypad 66, a microphone 68, and a speaker 70.

The display screen 62 and the microphone 68 are exposed through an inner face of a top part 72 of the housing 62. The keypad 66 and the speaker 70 are exposed through an inner face of a bottom part 74 of the housing 62. The top and bottom parts 72, 74 of the housing 62 are connected together by a hinged portion 76, which allows the top and bottom parts 72, 74 to pivot between an open state and a closed state. In the open state shown in FIG. 5, a user has access to the displays screen 64, the keypad 66, the microphone 68, and the speaker 70.

Figure 6A:
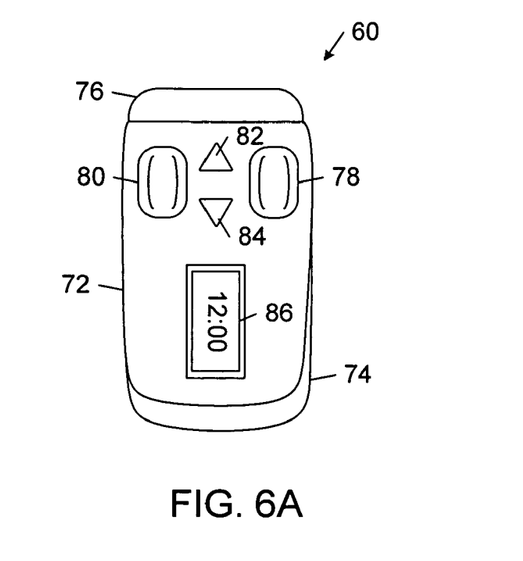
FIG. 6A is a diagrammatic top view of the embodiment of the handheld device shown in FIG. 5 in a closed state.

FIG. 6A shows a top view of the handheld device 60 in the closed state. As shown in this view, the top part 72 of the housing 62 includes right and left input buttons 78, 80, top and bottom scroll buttons 82, 84, and a display 86. In the illustrated embodiment, the right and left input buttons 78, 80 correspond to the right and left buttons of a computer mouse. The top and bottom scroll buttons 82, 86 implement up and down scroll functions that typically are implemented by movement of a joystick or computer mouse scroll wheel. The display screen 86 may display the current time (as shown) or it may display other useful information.

Figure 6B:
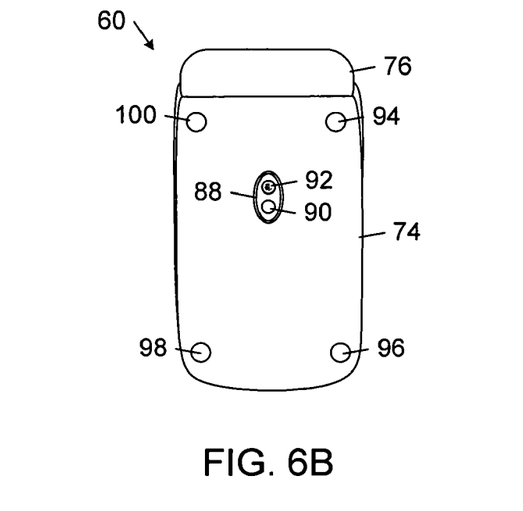
FIG. 6B is a diagrammatic bottom view of the embodiment of the handheld device shown in FIG. 5 in the closed state.

FIG. 6B shows a bottom view of the handheld device 60 in the closed state. A shown in this view, the bottom part 74 of the housing 62 includes an optical port 88 through an outer face. The optical port 88 allows light to be transmitted from an internal light source 90 to an area outside of the handheld device 60 and allows light from an area outside the handheld device 60 to be transmitted to an internal optical sensor 92. In the illustrated embodiment, the exterior surface of the bottom part 74 includes four raised surfaces 94, 96, 98, 100, which assist in sliding the handheld device 60 across a surface.

Figure 7:
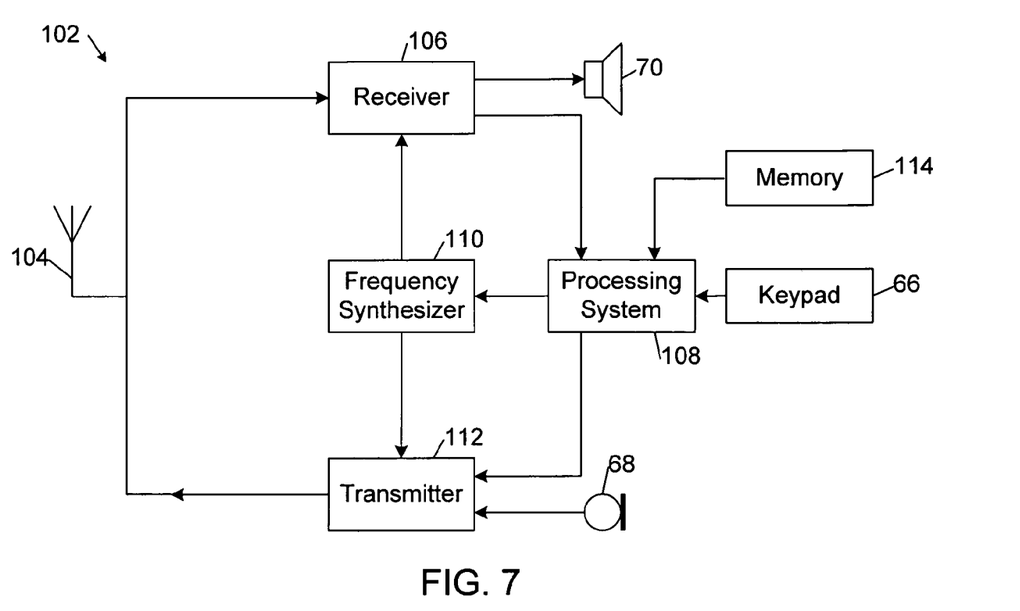
FIG. 7 is a block diagram of an embodiment of the telephone subsystem of the handheld device shown in FIG. 3.

FIG. 7 shows an embodiment 102 of the telephone subsystem 42 that includes an antenna 104, a receiver 106, the speaker 70, a processing system 108, a frequency synthesizer 110, a transmitter 112, the microphone 68, the keypad 66, and a memory 114. The processing system 108 choreographs the operation of the receiver 106, the transmitter 112, and the frequency synthesizer 110. The frequency synthesizer 110 controls the operating frequencies of the receiver 106 and the transmitter 112, and generates electronic radio frequency signals in response to control signals received from the processing system 108.

Figure 8:
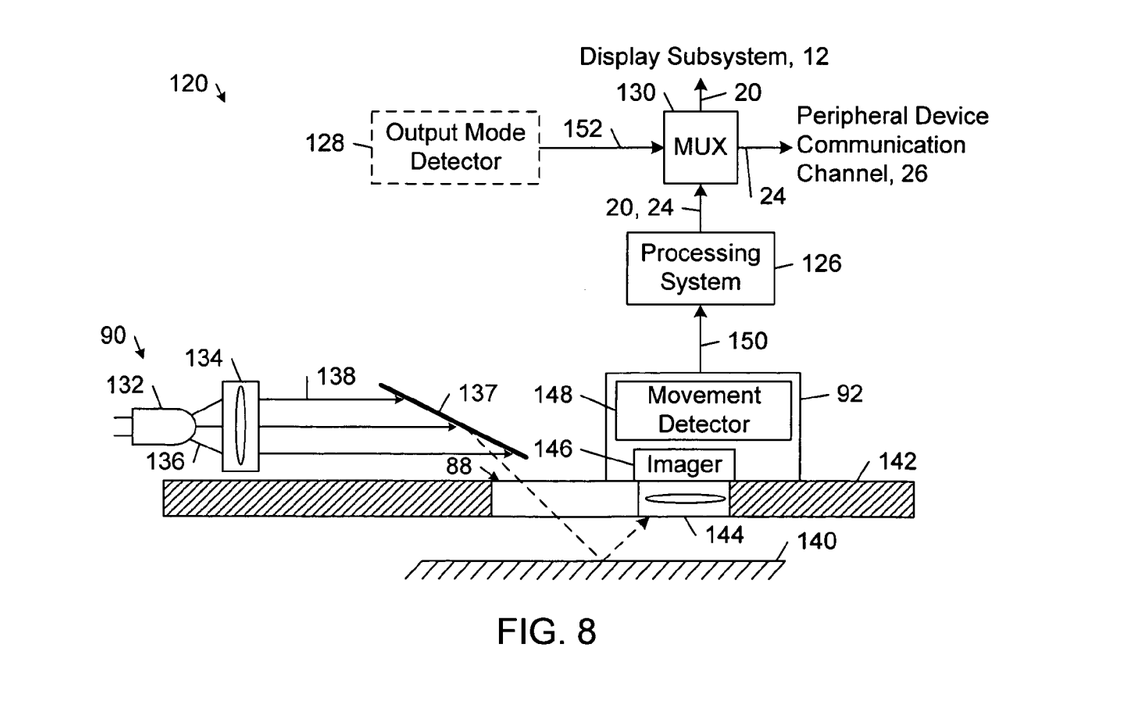
FIG. 8 is a block diagram of an embodiment of the pointing device subsystem of the handheld device shown in FIG. 3.

FIG. 8 shows an embodiment 120 of the pointing device subsystem 14 that includes the light source 90, the optical sensor 92, a processing system 126, an optional output mode detector 128, and a multiplexer 130 (MUX). The processing system 126 of the pointing device subsystem 120 and the processing system 108 of the telephone subsystem 102 may be separate or they may share one or more processing resources.

In the illustrated embodiment, the light source 90 is implemented by a light emitting diode 132 and an optical element 134 that collimates the light 136 that is produced by the light emitting diode 132 into a collimated beam 138. An optical element 137 (e.g., a mirror) deflects the collimated beam 138 through the optical port 88 that is formed in an exterior wall 142 of the bottom part 74 of the housing 62. In the illustrated example, the optical port 88 is positioned adjacent to a surface 140 (e.g., a desktop surface). A portion of the deflected beam that reflects from the surface 140 is focused by an optical element 144 onto the active areas of the optical sensor 92.

In some embodiments, the optical sensor 92 corresponds to an optical navigation sensor module that includes an imager 146 and a movement detector 148. The imager 146 may be any form of imaging device that is capable of capturing one-dimensional or two-dimensional images of the surface 140. The imager 146 includes at least one image sensor. Exemplary image sensors include one-dimensional and two-dimensional CMOS (Complimentary Metal-Oxide Semiconductor) image sensors and CCD (Charge-Coupled Device) image sensors. The imager 146 captures images at a rate (e.g., 1500 pictures or frames per second) that is fast enough so that sequential pictures of the surface 140 overlap. The imager 146 may include one or more optical elements that focus the light that reflects from the surface 140 onto the one or more image sensors.

The movement detector 148 may be part of the processing system 126 or it may be part of the optical sensor 92 as shown in FIG. 8. The movement detector 148 is not limited to any particular hardware or software configuration, but rather it may be implemented in any computing or processing environment, including in digital electronic circuitry or in computer hardware, firmware, or software. In one implementation, the movement detector 148 includes a digital signal processor (DSP). The movement detector 148 detects relative movement between the handheld device 60 and the surface 140 based on comparisons between images of the surface 140 that are captured by the imager 146. In particular, the movement detector 148 identifies texture or other features in the images and tracks the motion of such features across multiple images. These features may be, for example, inherent to the surface 140, relief patterns embossed on the surface 140, or marking patterns printed on the surface 140. The movement detector 148 identifies common features in sequential images and determines the direction and distance by which the identified common features are shifted or displaced.

In some implementations, the movement detector 148 correlates features identified in successive images to provide information relating to the position of the surface 140 relative to the imager 146. In general, any type of correlation method may be used to track the positions of features across successive images. In some embodiments, a sum of squared differences correlation method is used to find the locations of identical features in successive images in order to determine the displacements of the features across the images. In some of these embodiments, the displacements are summed or integrated over a number of images. The resulting integration values may be scaled to compensate for any image scaling by the optics associated with the imager 146. The movement detector 148 translates the displacement information into two-dimensional relative motion vectors 150 (e.g., X and Y motion vectors) that describe the relative movement of the handheld device 60 across the surface 140. Additional details relating to the image processing and correlating methods that are performed by the movement detector 148 can be found in U.S. Pat. Nos. 5,578,813, 5,644,139, 5,703,353, 5,729,008, 5,769,384, 5,825,044, 5,900,625, 6,005,681, 6,037,643, 6,049,338, 6,249,360, 6,259,826, 6,233,368, and 6,927,758. In some embodiments, the imager 146 and the movement detector 148 may be implemented by an optical mouse navigation sensor module (e.g., the ADNS-2051 optical mouse navigation sensor available from Agilent Technologies, Inc. of Palo Alto, Calif., U.S.A.).

The processing system 126 produces the display control signals 20, 24 from the two-dimensional motion vectors 150 that are generated by the movement detector 148.

The output mode detector 128 produces an output mode control signal 152 that controls the output path over which the multiplexer 130 transmits the display control signals 20, 24 (i.e., over a path that leads to the display subsystem 12 or over a path that leads to the peripheral device communication channel 26). In some embodiments, the output mode control signal 152 has a handheld device state and a pointing device state. In response to the receipt of the output mode control signal 152 in the handheld device state, the multiplexer 130 transmits the display control signals 20 to the display subsystem 12 without transmitting the display control signals 24 to the peripheral device communication channel 26. In response to the receipt of the output mode control signal 152 in the pointing device state, the multiplexer 130 transmits the display control signals 24 to the peripheral device communication channel 26 without transmitting the display control signals 20 to the display subsystem 12.

In some implementations, the handheld device state of the output mode control signal corresponds to a first (e.g., HIGH) logic state, and the pointing device state of the output mode control signal corresponds to a second (e.g., LOW) logic state. In some embodiments, the output mode detector 128 establishes the state of the output mode control signal 152 based on a switch that is manually set by a user. In other embodiments, the output mode detector 128 establishes the state of the output mode control signal 152 based on a determination of whether the handheld device 60 is in the open state (FIG. 5) or the closed state (FIG. 6A). In these embodiments, the output mode detector 128 places the output mode control signal 152 in the handheld device state when the handheld device 60 is determined to be in the open state and places the output mode control signal 152 in the pointing device state when the handheld device 60 is determined to be in the closed state. In some embodiments, the output mode detector 128 automatically determines the state of the handheld device 60 based on a signal from a switch (e.g., a hinge switch) and associated circuitry that detects whether the housing 62 is open or closed.

Figure 9:
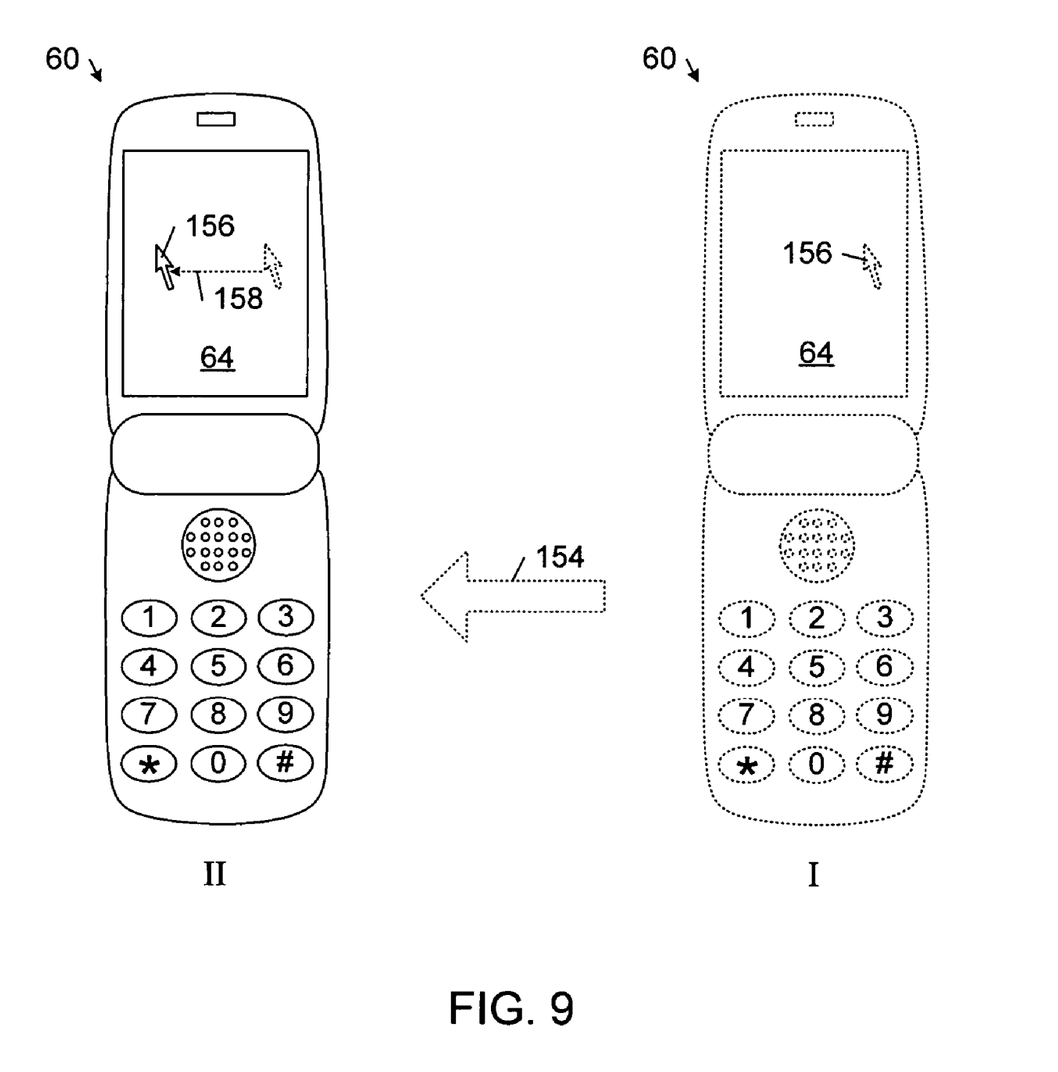
FIG. 9 is a diagrammatic view of the handheld device in the open state shown in FIG. 5, showing the movement of a pointer on a display of the handheld device in response to movement of the handheld device in a handheld device mode of operation.

FIG. 9 shows an example of the handheld device mode operation of the handheld device 60. In response to movement of the handheld device 60 over the surface 140 in the direction of arrow 154 from the position I (shown by the dashed lines) to the position II (shown by the solid lines), the processing system 126 generates the display control signals 20 based on the motion vectors 150 that are produced by the movement detector 148 (see FIG. 8). In this mode of operation, the output mode detector 128 determines that the handheld device 60 is in the open state and therefore transmits the display control signals 20 to the display subsystem 12. In response to the receipt of the display control signals 20 from the multiplexer 130, the display screen 64 shows the pointer 156 moving in the direction of arrow 158 from the dashed line position to the solid line position.

Figure 10:
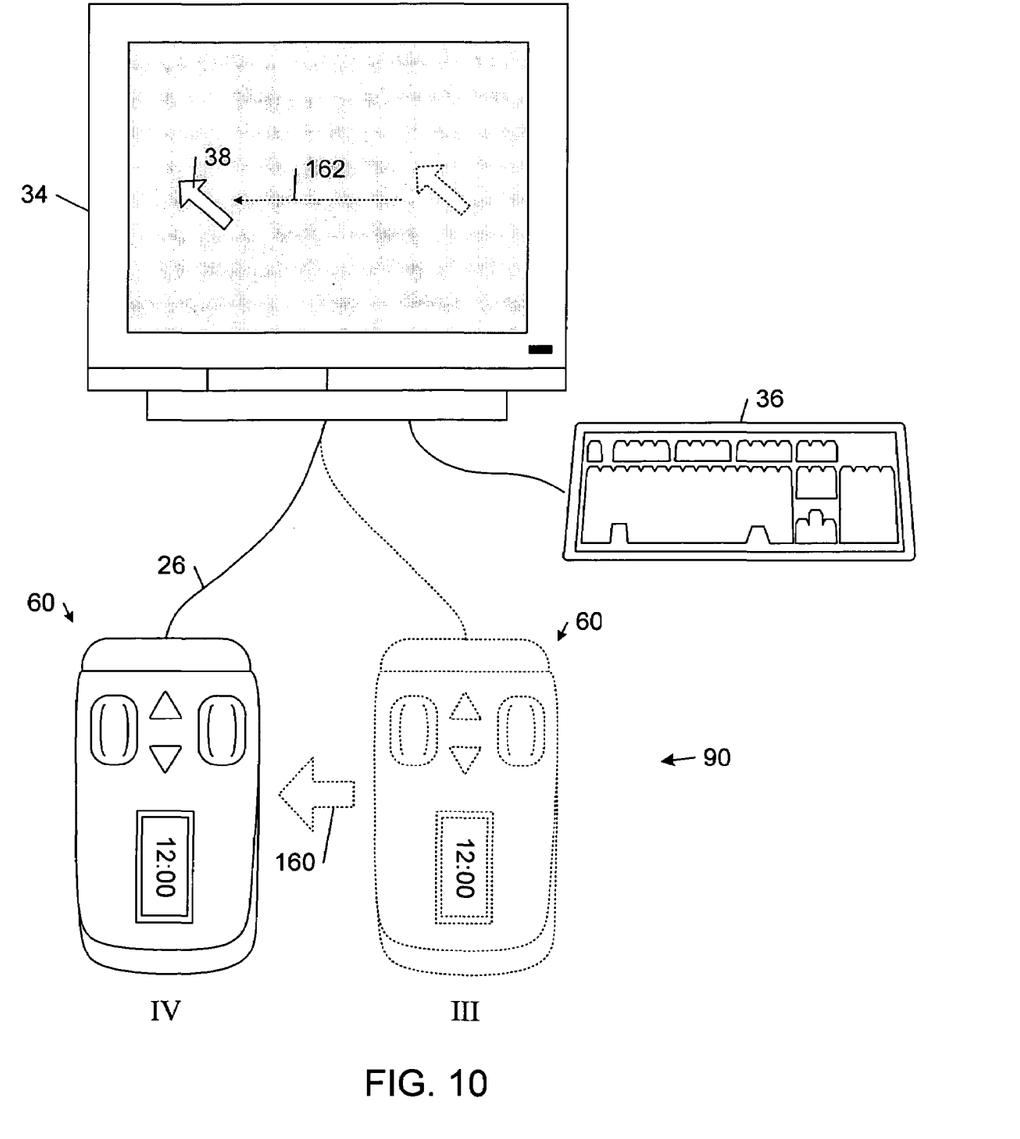
FIG. 10 is a diagrammatic view of the handheld device in the closed state shown in FIG. 6A, showing the movement of a pointer on a remote display in response to movement of the handheld device in a pointing device mode of operation.

FIG. 10 shows an example of the pointing device mode operation of the handheld device 60. In response to movement of the handheld device 60 over the surface 140 in the direction of arrow 160 from the position III (shown by the dashed lines) to the position IV (shown by the solid lines), the processing system 126 generates the display control signals 24 based on the motion vectors 150 that are produced by the movement detector 148 (see FIG. 8). In this mode of operation, the output mode detector 128 determines that the handheld device 60 is in the closed state and therefore transmits the display control signals 24 over the peripheral device communication channel 26 to the remote computer system 30. In response to the receipt of the display control signals 24 from the multiplexer 130, the display screen 34 shows the pointer 38 moving in the direction of arrow 162 from the dashed line position to the solid line position.

Figure 11:
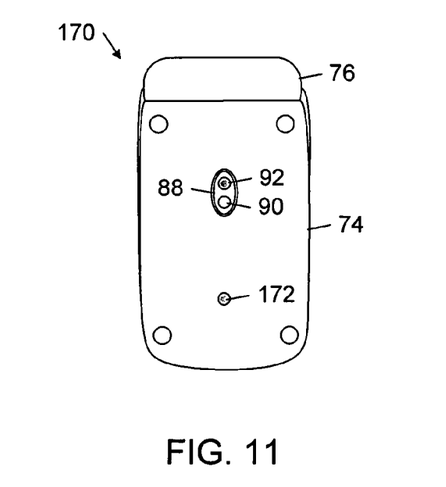
FIG. 11 is a diagrammatic bottom view of an embodiment of the handheld device shown in FIG. 3 that includes an input mode detector.
Figure 12:
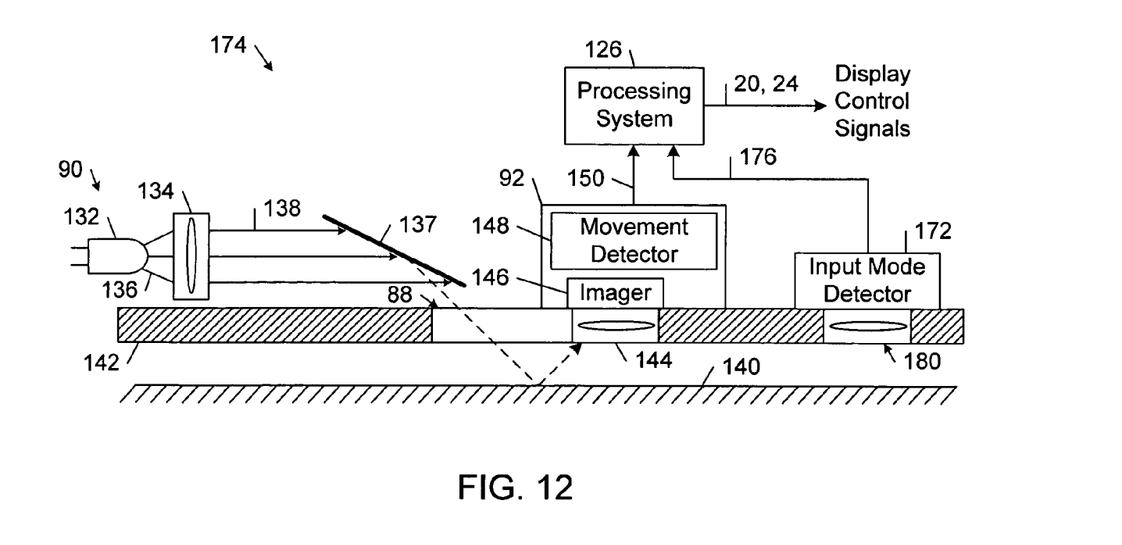
FIG. 12 is a block diagram of an embodiment of a pointing device subsystem of the handheld device shown in FIG. 11.
Figure 13:
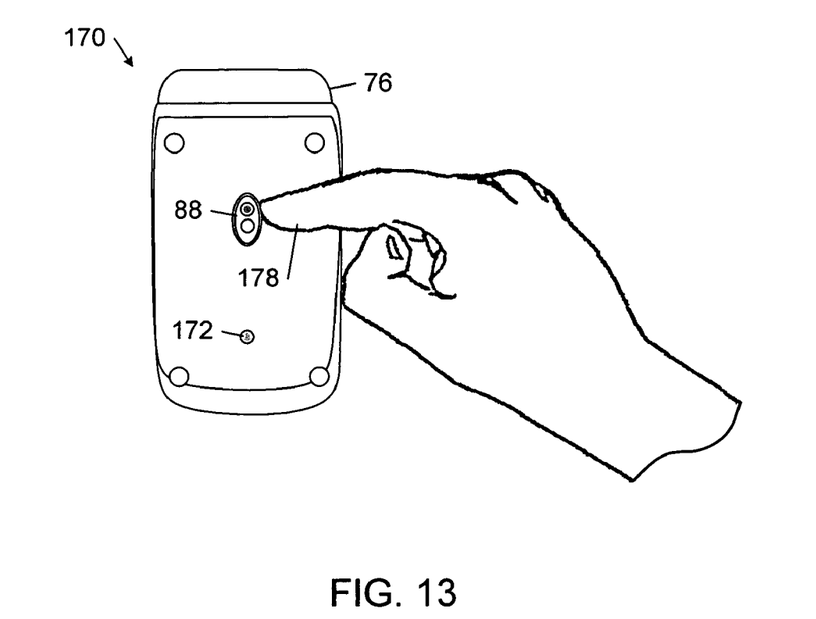
FIG. 13 is a diagrammatic bottom view of the embodiment of the handheld device shown in FIG. 11 and a person's finger inputting commands in accordance with a second input mode.

FIGS. 11 and 12 show an embodiment 170 the handheld device 60 that includes an input mode detector 172 incorporated in an embodiment 174 of the pointing device subsystem 120. The input mode detector 172 produces an input mode control signal 176 that has a first input mode state (e.g., logic state HIGH) and a second input mode state (e.g., logic state LOW). The first input mode state corresponds to the input mode described above, in which the processing system 126 generates the display control signals 20, 24 in accordance with the handheld device 170 being moved relative to the stationary surface 140. The second input mode state corresponds to an input mode in which the handheld device 170 is stationary and a surface is moved relative to the optical port 88 (e.g., a person's finger 178, as shown in FIG. 13). In the second input mode state, the processing system 126 generates the display control signals 20, 24 in substantially the same way as in the first input mode state, except that the directional polarity of the display control signals 20, 24 that are generated in the second input mode state is opposite the directional polarity of the display control signals 20, 24 that are generated in the first input mode state.

The directional polarity difference between the first and second input mode states accommodates the user's different expectations regarding the movement of the pointer (38, 156) in response to movement of the handheld device 170 relative to a fixed surface as compared to movement of a surface, such as a finger, relative to the handheld device 170. For example, when the user moves the handheld device 170 in an upward direction across a fixed surface, the user expects the pointer to move in an upward direction in the display screen. Similarly, when the user moves a finger in an upward direction across the optical port 88, the user expects the pointer to move in an upward direction in the display screen. However, the movement detector 148 sees the upward movement of the handheld device across the fixed surface as an upward movement, whereas the movement detector 148 sees the upward movement of the finger across the optical port 88 as downward movement. The processing system 126 corrects this discrepancy by setting the directional polarity of the display control signals based on the input mode control signal 176.

In some embodiments, the input mode detector 172 includes a photodetector, which is positioned to receive light through a second optical port 180 in the exterior wall 142 of the bottom part 74 of the housing 62. The second optical port 180 preferably is positioned at a location on the outer face of the bottom part 74 of the housing 62 that is displaced from the first optical port 88 and typically is not covered by the user's hand during normal use of the handheld device in the second input mode. In these embodiments, the input mode detector 172 sets the input mode state of the input mode control signal 176 based on the intensity of light that is detected through the second optical port 180 in relation to an empirically determined threshold. If the detected light intensity is below the threshold, the input mode detector 172 sets the input mode control signal 176 in the first input mode state (under the assumption that the detected light intensity will be low when the bottom part 74 of the handheld device is positioned adjacent to the surface 140). Conversely, if the detected light intensity is equal to or greater than the threshold, the input mode detector 172 sets the input mode control signal 176 in the second input mode state (under the assumption that the detected light intensity will be high when the bottom part 74 of the handheld device is removed from the surface 140).

Figure 14:
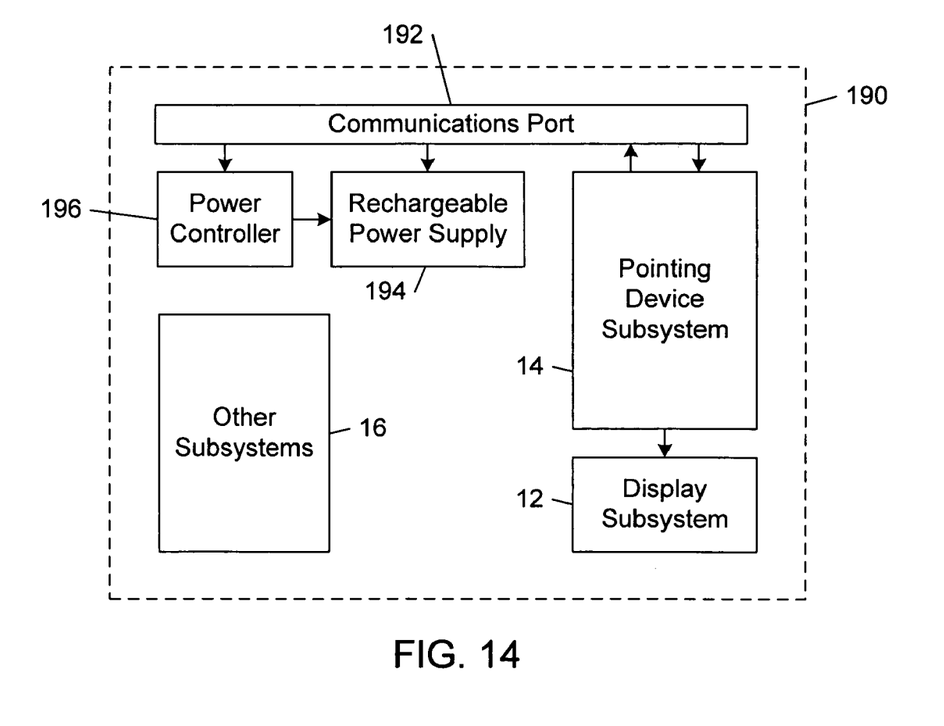
FIG. 14 is a block diagram of an embodiment of the handheld device shown in FIG. 1.

FIG. 14 shows an embodiment 190 of the handheld device 10 that includes a communications port 192, a rechargeable power supply 194, and a power controller 196. The communications port 192 interfaces the pointing device subsystem 14 with the peripheral device communications channel 26. The communications port 192 additionally interfaces the rechargeable power supply 194 to an external power source. In this embodiment, the communications port 192 corresponds to a wired communications channel that supports the delivery of power, such as a universal serial bus port or a Firewire (IEEE-1394) port.

The rechargeable power supply 194 may be any type of battery or other electrical power store that can be recharged by an external power source through the communications port 192. The rechargeable power supply 194 supplies power to the energizable components of the handheld device 190, including the display subsystem 12 and the pointing device subsystem 14.

The power controller 196 controls the supplying of power from the rechargeable power supply 194. In general, the power controller 196 may implement any one of a wide variety of different power management algorithms. In some embodiments, the power controller 196 is implemented by the separate or shared processing resources of the pointing device subsystem 14 and the other subsystems 16, instead of a separate component as shown in FIG. 14.

Other embodiments are within the scope of the claims.

What is claimed is:

1. A handheld device, comprising:
    a display subsystem including a local display screen;
    a pointing device subsystem including a movement detector that produces display control signals in response to user input and has a handheld device mode of operation in which the pointing device subsystem selectively communicates the display control signals produced by the movement detector in response to the user input to the display subsystem to control the local display screen and an input device mode of operation in which the pointing device subsystem selectively communicates the display control signals produced by the movement detector in response to the user input to a peripheral device communication channel to control a remote display screen of a peripheral device, wherein the pointing device subsystem comprises an optical port and an optical sensor that produces optical sensor signals in response to light received through the optical port, wherein the pointing device subsystem produces the display control signals from the optical sensor signals; and
    an input mode detector that produces an input mode control signal having a state selected from a first input mode state and a second input mode state, wherein the pointing device subsystem processes the optical sensor signals into the display control signals differently depending on the state of the input mode control signal,
    wherein the pointing device subsystem produces the display control signals with a first directional polarity when the input mode control signal is in the first input mode state and produces the display control signals with a second directional polarity opposite the first directional polarity when the input mode control signal is in the second input mode state.

2. The device of claim 1, wherein the optical sensor includes an image sensor that captures images of a surface received through the optical port and the pointing device subsystem produces the display control signals from differences between different images of the surface captured by the image sensor.

3. The device of claim 1, wherein the pointing device subsystem comprises a second optical port displaced from the first optical port, and the input mode detector comprises a photodetector that produces the input mode control signal in the first input mode state when it detects light through the second optical port and produces the input mode control signal in the second input mode state when it fails to detect light through the second optical port.

4. The device of claim 1, further comprising an output mode detector that produces an output mode control signal having a state selected from a handheld device state and a pointing device state, wherein the pointing device subsystem communicates the display control signals to the display subsystem only when the output mode control signal is in the handheld device state and communicates the display control signals to the peripheral device communication channel only when the output mode control signal is in the pointing device state.

5. The device of claim 4, further comprising a housing containing the display subsystem and the pointing device subsystem, the housing having an open state and a closed state, wherein the output mode detector produces the output mode control signal in the handheld device state when the housing is in the open state and produces the output mode control signal in the pointing device state when the housing is in the closed state.

6. The device of claim 5, further comprising at least one input button integrated into the housing, wherein the pointing device subsystem produces one or more display control signals in response to actuation of the at least one input button.

7. The device of claim 1, further comprising a communications port that interfaces the pointing device subsystem with the peripheral device communications channel.

8. The device of claim 7, further comprising a rechargeable power supply that supplies power to the display subsystem and the pointing device subsystem, wherein the communications port additionally interfaces the rechargeable power supply to an external power source.

9. The device of claim 1, further comprising a telephone subsystem that transduces between audio signals and telephony signals and communicates the telephony signals over a telephony communications channel.

10. A method of producing display control signals, comprising:
    producing display control signals by a movement detector of a handheld device in response to user input, wherein the producing comprises generating optical sensor signals in response to light received through an optical port and producing the display control signals from the optical sensor signals;
    in a handheld device mode of operation, selectively communicating the display control signals produced by the movement detector in response to the user input to a display subsystem of the handheld device to control a local display screen of the display subsystem;
    in an input device mode of operation, selectively communicating the display control signals produced by the movement detector in response to the user input to a peripheral device communication channel to control a remote display screen of a peripheral device; and
    producing an input mode control signal having a state selected from a first input mode state and a second input mode state, wherein the producing of the display control signals depends on the state of the input mode control signal,
    wherein the producing comprises producing the display control signals with a first directional polarity when the input mode control signal is in the first input mode state and producing the display control signals with a second directional polarity opposite the first directional polarity when the input mode control signal is in the second input mode state.

11. The method of claim 10, wherein the producing comprises capturing images of a surface received through the optical port and producing the display control signals from differences between the captured images of the surface.

12. The method of claim 10, further comprising producing an output mode control signal having a state selected from a pointing device state and a pointing device state, wherein the display control signals are selectively communicated to the display subsystem only when the output mode control signal is in the pointing device state and the display control signals are selectively communicated to the peripheral device communication channel only when the output mode control signal is in the pointing device state.

13. The method of claim 12, wherein the producing of the output mode control signal comprises producing the output mode control signal in the pointing device state when a handheld device housing is in the open state and producing the output mode control signal in the pointing device state when the housing is in the closed state.

14. The method of claim 10, further comprising transducing between audio signals and telephony signals, and communicating the telephony signals over a telephony communications channel.

\* \* \* \* \*